(12) United States Patent
Bauer et al.

(10) Patent No.: US 10,115,977 B2
(45) Date of Patent: Oct. 30, 2018

(54) METHOD FOR MAKING A MEMBRANE-ELECTRODE ASSEMBLY WITH PERIPHERAL SEAL, AND THE MEMBRANE-ELECTRODE ASSEMBLY

(71) Applicant: ELCOMAX GMBH, München (DE)

(72) Inventors: Felix Bauer, München (DE); Christian Wolz, Haar (DE)

(73) Assignee: ELCOMAX GMBH, München (DE)

( * ) Notice: Subject to any disclaimer, the term of this patent is extended or adjusted under 35 U.S.C. 154(b) by 113 days.

(21) Appl. No.: 15/054,251

(22) Filed: Feb. 26, 2016

(65) Prior Publication Data
US 2016/0181630 A1 Jun. 23, 2016

Related U.S. Application Data

(63) Continuation of application No. PCT/EP2014/002312, filed on Aug. 23, 2014.

(30) Foreign Application Priority Data

Aug. 27, 2013 (DE) .......................... 10 2013 014 083

(51) Int. Cl.
| | |
|---|---|
| H01M 2/08 | (2006.01) |
| H01M 8/0273 | (2016.01) |
| H01M 8/242 | (2016.01) |
| H01M 8/086 | (2016.01) |
| H01M 8/0276 | (2016.01) |

(Continued)

(52) U.S. Cl.
CPC .......... *H01M 8/0273* (2013.01); *H01M 4/86* (2013.01); *H01M 8/0276* (2013.01); *H01M 8/0284* (2013.01); *H01M 8/086* (2013.01); *H01M 8/1004* (2013.01); *H01M 8/242* (2013.01); *H01M 8/2483* (2016.02);

(Continued)

(58) Field of Classification Search
None
See application file for complete search history.

(56) References Cited

U.S. PATENT DOCUMENTS

| | | |
|---|---|---|
| 6,475,656 B1 | 11/2002 | Koschany et al. |
| 6,596,427 B1 | 7/2003 | Wozniczka et al. |

(Continued)

FOREIGN PATENT DOCUMENTS

| | | |
|---|---|---|
| DE | 197 03 214 C2 | 11/1998 |
| DE | 10 2006 004 748 A1 | 8/2007 |

(Continued)

OTHER PUBLICATIONS

International Search Report, dated Oct. 9, 2014, with Written Opinion for International Application PCT/EP2014/002312.

*Primary Examiner* — Lucas J. O'Donnell
(74) *Attorney, Agent, or Firm* — Myers Wolin, LLC

(57) ABSTRACT

A method is provided for producing a membrane electrode unit, provided with a peripheral seal and a peripheral sealing frame for an electrochemical cell, comprising the steps of: (A) producing a sandwich-like arrangement, forming the membrane electrode unit, from a membrane and two gas diffusion electrodes, (B) connecting the sandwich-like arrangement to a seal that extends around said electrodes at the lateral outer edge thereof, said seal at the same time establishing the connection to the sealing frame that extends laterally around the membrane electrode unit.

19 Claims, 5 Drawing Sheets

(51) Int. Cl.
  *H01M 8/0284* (2016.01)
  *H01M 8/2483* (2016.01)
  *H01M 8/2484* (2016.01)
  *H01M 4/86* (2006.01)
  *H01M 8/1004* (2016.01)
  *H01M 8/1018* (2016.01)

(52) U.S. Cl.
  CPC .. *H01M 8/2484* (2016.02); *H01M 2004/8694* (2013.01); *H01M 2008/1095* (2013.01); *Y02P 70/56* (2015.11)

(56) References Cited

U.S. PATENT DOCUMENTS

| | | | |
|---|---|---|---|
| 7,722,978 B2 | 5/2010 | Artibise et al. | |
| 7,914,943 B2 | 3/2011 | Wozniczka et al. | |
| 2004/0241525 A1* | 12/2004 | Mekala | H01M 4/8828 156/263 |
| 2009/0004543 A1* | 1/2009 | Jung | H01M 4/8605 429/406 |
| 2009/0162732 A1 | 6/2009 | Noblet et al. | |
| 2009/0165933 A1* | 7/2009 | Losch | H01M 8/0271 156/182 |
| 2009/0220834 A1 | 9/2009 | Schaack et al. | |

FOREIGN PATENT DOCUMENTS

| | | |
|---|---|---|
| EP | 1 276 164 A2 | 1/2003 |
| EP | 1526593 A1 | 4/2005 |
| EP | 1 759 434 A1 | 3/2007 |
| WO | 9904446 A1 | 1/1999 |
| WO | 0010216 A1 | 2/2000 |
| WO | 2004015797 A1 | 2/2004 |
| WO | 2004047210 A2 | 6/2004 |
| WO | 2011157377 A2 | 12/2011 |

* cited by examiner

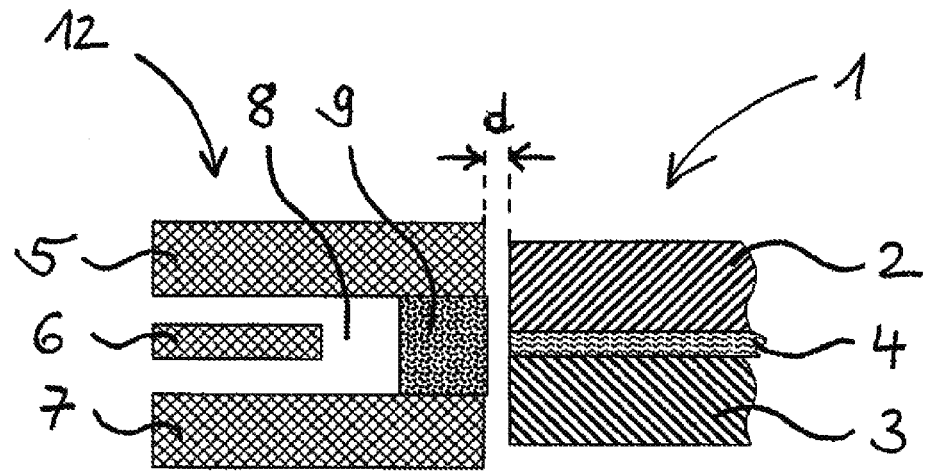
(A)
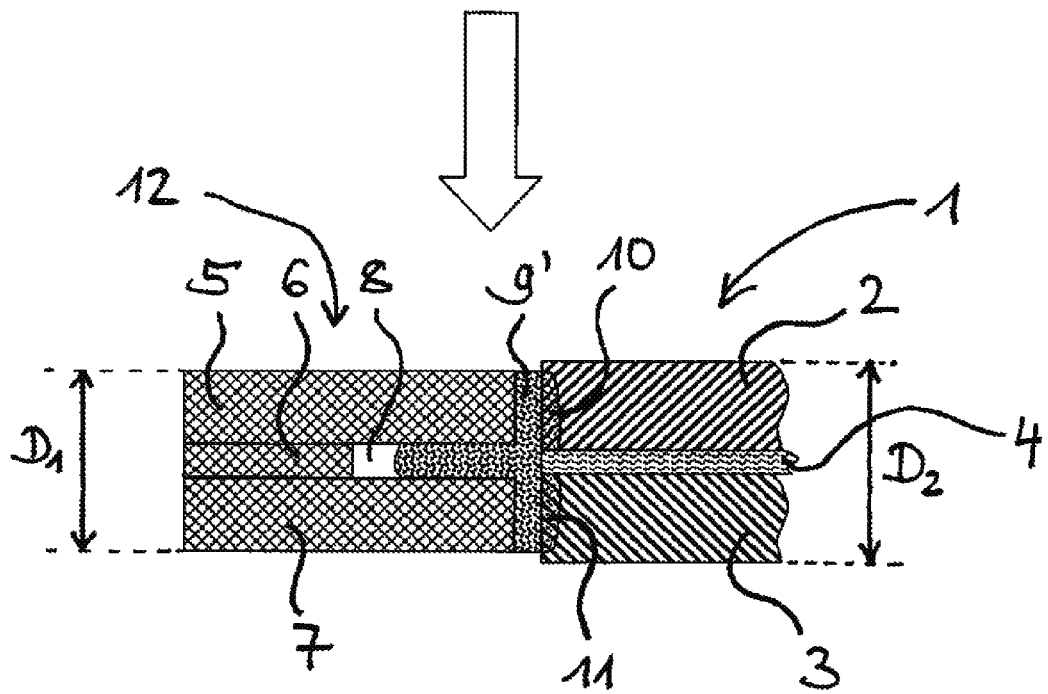
(B)
Fig. 1

METHOD FOR MAKING A MEMBRANE-ELECTRODE ASSEMBLY WITH PERIPHERAL SEAL, AND THE MEMBRANE-ELECTRODE ASSEMBLY

CROSS REFERENCE TO RELATED APPLICATIONS

This application is a continuation under 35 U.S.C. § 120 of International Application PCT/EP2014/002313, filed Aug. 23, 2014, which claims priority to German Application 10 2013 014 083.3, filed Aug. 27, 2013, the contents of each of which are incorporated by reference herein.

FIELD OF THE INVENTION

The present invention concerns a method for making a membrane-electrode assembly (MEA) with a peripheral seal and a peripheral sealing frame for an electrochemical cell, especially for a fuel cell. Moreover, the present invention concerns an MEA so produced with a peripheral seal and a peripheral sealing frame as well as a fuel cell stack outfitted with a plurality of such MEAs.

BACKGROUND

Methods for making an MEA with peripheral seal or corresponding MEAs or a fuel cell stack containing such MEAs are rather well known from the prior art, wherein the peripheral seal at the margin of the MEA on the one hand should effectively prevent leakage around the membrane between the electrodes (anode and cathode) arranged on different sides of the membrane and on the other hand be as long-lived as possible under the usually harsh operating conditions in an electrochemical cell (fuel cell). The present invention should be especially suitable for use with so-called "flush-cut" MEAs in which the (gas diffusion) electrodes surrounding the membrane in sandwich fashion are flush with the membrane at the margin. "Flush-cut" MEAs can thus be separated or cut out economically from a large-area and possibly already hot-pressed MEA composite—making possible a roll or sheet production.

A number of aspects are relevant for an effective sealing concept in the peripheral sealing of the MEAs, which are generally arranged between bipolar plates in a fuel cell stack.

In particular, a production method should be provided with which a production of a connection of MEAs with peripheral seal should be made possible in an especially simple and reliably reproducible manner, which are suitable—depending on the materials used—either for use in low-temperature (LT) fuel cells with operating temperatures of less than 100° C. or in high-temperature (HT) fuel cells with operating temperatures of (substantially) more than 100° C. In the case of a use of MEAs with peripheral seal according to the invention in HT fuel cells, it is of special importance that the MEAs and the bipolar plates of a fuel cell stack have a (generally very low) coefficient of thermal expansion, which is significantly different from the (generally higher) coefficient of thermal expansion of a sealing material used to seal the MEA. Especially in the case of using a polymer sealing material, one often resorts to elastomers in the prior art, especially for MEAs for low-temperature fuel cells, which due to their elasticity can balance out the mechanical stresses occurring on account of different coefficients of thermal expansion. Moreover, it is of fundamental importance in the context of the necessary sealing of an MEA that the materials used for a sealing must withstand the harsh conditions in an electrochemical cell for an appropriate lifetime, which especially needs to be taken into account for HT-PEM fuel cells and phosphoric acid fuel cells (PAFC) on account of the usual presence of strong acids in the membrane there.

Thus, e.g., it is known from the prior art that the MEA for sealing purposes is provided with a seal of elastomeric material encircling the MEA at the margin and also overlapping the (gas diffusion) electrodes in a marginal region, as is shown in EP 1 759 434 A1, for example. However, the elastomers preferably used there, insofar as these are even suitable for use in high-temperature fuel cells (such as HT-PEM with phosphoric acid-doped membrane) with an operating temperature range, for example, between 100 and 250° C. (or higher), are either comparatively costly or they have a suboptimal (phosphoric) acid resistance and thus a relatively short lifetime.

Moreover, it is known, for example from WO 2004/015797 A1, how to outfit the MEA of a fuel cell in its marginal region with a polyimide or polyether imide frame enclosing the marginal region of the MEA on both sides by lamination (at temperatures lying below the melting point of polyimide). Such a polyimide frame provides an edge reinforcement for the MEA, but not a true seal, since further seals are absolutely necessary here to seal off the MEA against the bipolar or separator plates of a fuel cell, which makes its fabrication relatively costly—besides the high price for suitable polyimides. Moreover, an increasing embrittlement occurs for such polyimide edge reinforcements partly overlapping the MEA on the top and bottom as their service life increases, which is apparently due to the fact that the coefficient of thermal expansion of polyimide is greater than that of a typical MEA (or the membrane). And finally it is to be noted that this sealing concept is only suitable for MEAs in which the membrane projects to the side beyond the two gas diffusion electrodes, since one can only effectively prevent a leakage between anode and cathode side by direct embedding of the margin region of the membrane in the polyimide frame laminated on the marginal region of the MEA. In other words, the concept described in WO 2004/015797 A1 is not suitable for use on flush-cut MEAs in which the membrane and the gas diffusion electrodes are laterally flush with each other.

In WO 99/04446 A1 further seal arrangements are shown for the MEA of a fuel cell, in which an integral seal encircling the respective MEA is sprayed onto the lateral edge of the MEA from the side, once again making use of an elastomer as the sealing material. However, the lateral spraying of the sealing material is relatively cumbersome. Moreover, this sealing concept as well proves to be suboptimal due to the already mentioned drawbacks for the use of elastomer materials, especially for high-temperature fuel cells.

A rather complicated sealing arrangement, known from U.S. Pat. No. 6,596,427 B1, calls for a double sealing concept for electrochemical cells with an outer seal encapsulating the cell stack on at least one side and separate cell seals surrounding the individual MEAs. The MEA here is separated by means of the cell seal from the outer seal, consisting of a thermoplastic material for example, in order to avoid a direct contact between outer seal and MEA.

Further sealing arrangements are known from U.S. Pat. No. 7,722,978 B2, U.S. Pat. No. 7,914,943 B2, DE 10 2006 004 748 A1, DE 197 03 214 C2 and WO 2011/157377 A2. The sealing materials or arrangements used there are either designed specifically for use in low-temperature fuel cells with an operating temperature <100° C. or are not optimally suited for use in HT-PEM (high-temperature polymer-electrolyte-membrane) fuel cells with operating temperatures of (substantially) >100° C.

Against this background, in the context of the present invention there shall be proposed an effective sealing concept for MEAs which can be used as universally as possible for electrochemical cells (including LT or HT fuel cells) and as economically as possible, and which is also suitable in preferred manner for use with "flush-cut" MEAs.

SUMMARY

The above problem is solved with a method for the making of an MEA provided with a peripheral seal according to the claims and an MEA so produced according to the claims. Preferred modifications of the present invention will result from the subclaims.

The method according to the invention for making a membrane electrode assembly provided with a peripheral seal and a peripheral sealing frame for an electrochemical cell, especially for a fuel cell, comprises the following steps:

(A) Making of a sandwich arrangement forming the membrane electrode assembly from a membrane and two gas diffusion electrodes (B) Connecting of the sandwich arrangement to a seal encircling it on its outer side edge, which at the same time provides the connection to the sealing frame encircling the membrane electrode assembly at the side, wherein step (B) is done by using a pressing operation and wherein the sealing material of the seal bonding the membrane electrode assembly to the sealing frame is arranged in a gap of the sealing frame open to the outer side edge of the membrane electrode assembly prior to performing the pressing operation, such that a portion of the sealing material which is flowable during the pressing operation penetrates laterally into the two gas diffusion electrodes.

Thus, in other words, the present invention creates a sealing concept for an MEA in which the MEA produced according to the invention is sealed off around the sides by means of a seal which in turn makes a connection to a sealing frame encircling the MEA. The MEA is thus held to some extent by the sealing material inside the sealing frame encircling the MEA (preferably with a slight distance from it). Because the (later hardening) sealing material penetrates laterally during the pressing operation which makes the connection into the previously open pore structure of the two gas diffusion electrodes which cover the membrane on various sides, an effective edge sealing of the MEA can occur. The arrangement of the sealing material in a gap of the sealing frame open toward the outer side edge of the membrane electrode assembly allows for high reliability in the high-quality and exactly reproducible making of the connection of MEA, seal and sealing frame by means of the pressing operation used according to the invention, which can be ensured especially by suitable dimensioning of the gap and the precisely dictated (relative) arrangement of sealing frame, sealing material, and MEA.

Moreover, only a slight amount of sealing material is needed to produce an adequate sealing effect and by arrangement of the sealing material in a gap open only toward the side edge of the MEA one can assure that little or no sealing material comes into contact with the pressing tool, making possible a fast and trouble-free stripping of the pressing tool from the mold.

The sealing frame, consisting of a material which is (largely) incompressible under the pressure relations occurring in a fuel cell stack, can with its predetermined thickness act as an end stop to dictate the (minimum) distance between the bipolar or separator plates surrounding the MEA and the sealing frame at the anode and cathode side. The seal achieved by the invention can thus serve both to produce a seal between anode and cathode side and to produce a seal from the surroundings. Moreover, by suitable choice of the thickness of the sealing frame, the maximum permitted compression of the MEA by the bipolar plates can be adjusted precisely.

Moreover, it should also be noted that the term "membrane" in the context of the present invention is to be understood broadly and in particular also encompasses ion-conductive electrolyte structures such as are used in a PAFC, for example.

In a first preferred modification of the method according to the invention, the membrane electrode assembly, the sealing material and the sealing frame are suitable for use in a LT-PEM or HT-PEM fuel cell.

For use of a MEA made according to the invention in a LT-PEM fuel cell, in which Nafion-based membranes are used for example, one can use in particular silicone rubber (VMQ), fluorosilicone rubber (FVMQ), fluororubber (FKM/FPM), perfluororubber (FFKM/FFPM), ethylene-propylene-diene rubber (EPDM), polyisobutene (PIB), tetrafluoroethylene/propylene rubber (FEPM), silicone resins, polyimides, polybenzoxazines, epoxy resins and/or polyester as sealing material for the seal surrounding the membrane, which at the same time produces the connection to the sealing frame.

Furthermore, in the context of the present invention, it can be especially preferable for the pressing operation to be a hot pressing operation, during which the sealing material is heated to a temperature above its melting temperature or above its melting range. This is especially expedient when one is using a sealing material which must be heated in order to produce the necessary flowability for the method of the invention, in order to make possible the lateral penetration of the sealing material into the porous structure of the gas diffusion electrodes of the MEA required in the context of the invention.

Moreover, it has been discovered in the context of the present invention that thermoplastic materials are also advantageously suitable as sealing material—both for use in LT fuel cells (such as LT-PEM or direct methanol fuel cell (DMFC)) and for use in HT (PEM) fuel cells (such as those based on HT-PEM) with operating temperatures greater than 100° C. and up to operating temperatures of around 250° C. It is preferable to use a hot pressing operation during the manufacturing process, in which the thermoplastic sealing material is heated above its melting point, so that it can penetrate thanks to its thus necessarily increased flowability laterally into the previously open pore structure of the two gas diffusion electrodes covering the membrane on various sides.

Insofar as the sealing material in step (B) is heated in a hot pressing operation to a temperature lying above its melting temperature or above its melting range, it should be noted a manufacturer's statement exists for conventional thermoplastics or other sealing materials as to the particular melting temperature (or upper and lower limits of the melting range) and that this can be determined in customary manner, such as by U.S. standard ASTM D4591.

In the context of the present invention it has been discovered in particular that when selecting a suitable thermoplastic sealing material, especially in regard to its melting temperature (range) given the operating temperature of the fuel cell, one can take advantage of its property of becoming softened already at temperatures (just) below its melting point, so that during operation of the fuel cell in a suitable temperature range any mechanical stresses caused by thermal expansion can be adequately compensated by the seal consisting of a thermoplastic material.

Another advantage of the use of a thermoplastic sealing material is that this can significantly speed up the manufacturing of the seal—as compared to the use of elastomers known from the prior art. Whereas an elastomer suitable as sealing material generally needs a heat activated cross linking agent and a not inconsiderable span of time for its curing, a thermoplastic sealing material remains shape-stable immediately after being cooled down to below its melting point, so that the manufacturing time for a MEA provided with a peripheral seal in the method according to the invention can also be reduced.

Insofar as a thermoplastic sealing material is used in the context of the present invention, basically all known thermoplastic materials can be considered for this (such as fluoropolymers, polytetrafluoroethylene (PTFE), ethylene-tetrafluoroethylene copolymer (ETFE), perfluoroethylene-propylene copolymer (FEP), perfluoroalkoxy-copolymer (PFA), tetrafluoroethylene-hexafluoropropylene-vinylidene fluoride terpolymer (THV), polychlorotrifluoroethylene (CTFE), polyvinylidene fluoride (PVDF), liquid crystal polymers (LCP), polyether ether ketone (PEEK), polyether ketone (PEK), polyethersulfone (PES), polyphenylene sulfide (PPS), polysulfone (PSU), polybenzimidazole (PBI), etc.), which have a suitable temperature, acid and water vapor resistance for the particular application, as well as a suitable temperature behavior for the particular purpose of use.

Preferably a fluoropolymer will be used as the thermoplastic sealing material, especially THV.

THV is an especially chemically resistant terpolymer of tetrafluoroethylene ($CF_2$—$CF_2$), hexafluoropropylene ($CF_3$—CF—$CF_2$) and vinylidene fluoride ($CF_2$—$CH_2$), in which variation of the relative shares of the aforementioned components can adjust the melting point (i.e., the melting temperature or the melting temperature range) of the material over a broad range, and which can be produced especially economically.

Insofar as a hot pressing operation is done in the context of the method of the invention for making the composite of MEA, seal and sealing frame, one can either use in step (B) of the method of the invention a MEA already hot-pressed into a composite or can also hot press together at the same time the membrane and the gas diffusion electrodes situated on either side with the hot pressing operation which heats the sealing material—using a not yet hot pressed sandwich of two gas diffusion electrodes with a membrane lying in between.

Moreover, it can be preferably provided in the context of the invention that the sealing frame is made from at least two layers of an incompressible material with low coefficient of thermal expansion, especially a fabric-reinforced plastic. By "incompressible" is meant a material which is not compressed or only slightly compressed when braced as usual between the bipolar or separator plates (i.e., under the forces typically exerted on the fuel cell stack in a fuel cell and the (pressure) relations resulting from this), that is, largely retains its predetermined thickness. A low coefficient of thermal expansion occurs especially when it has a value—at 20° C.—of less than $3*10^{-5}$ $K^{-1}$. A fabric-reinforced plastic, such as a fiberglass-reinforced PTFE (such as the one available under the brand "Chemfab"), which is especially preferable, fulfills these properties.

When a thermoplastic sealing material is used in the context of the present invention and the sealing frame is made from a material with low coefficient of thermal expansion, as explained above, thanks to the generally also especially low coefficient of thermal expansion of a typical MEA and the connection between MEA and sealing frame produced exclusively through the thermoplastic at high temperatures, one gets a structure which prevents bulging of the MEA at room temperature, which improves its manipulability.

Furthermore, in another modification of the present invention, it can be especially preferable for each layer of the sealing frame to be composed of two pieces of a fabric-reinforced plastic. In this case, moreover, one can assure in especially simple manner that the individual layers and/or the individual pieces of the different layers of the sealing frame are tightly bonded together in step (B) by the sealing material. Moreover, as shall be explained below with the help of a sample embodiment, this can assure an almost waste-free consumption of the material used for the sealing frame.

As already explained above, the MEA can either be hot pressed already before carrying out step (B) or at the same time as step (B), while in the latter variant one can economize on an otherwise separately performed hot pressing operation.

Moreover, in the context of the present invention it is preferable that the MEA be produced by the flush-cut process, which likewise makes possible an especially cost-sparing production of suitably sealed MEAs.

As was already explained above with the help of the preferably used material known as THV, a thermoplastic sealing material used in the context of the present invention can preferably be made from at least two monomer components, whose proportions have influence on the melting point, i.e., the melting temperature or the melting range of the thermoplastic sealing material. In this way, an especially simple adjustment of the melting point of the sealing material to the operating temperature for which the correspondingly produced MEAs are to be suitable can be achieved.

In especially preferred manner, one can make sure that the membrane electrode assembly is provided for use in a fuel cell at a predetermined nominal operating temperature or within a predetermined nominal operating temperature range, wherein the melting temperature or the melting range of the sealing material is selected or adjusted (e.g. by suitable choice of the nature and/or composition of the sealing material) so that the melting temperature or the melting range of the sealing material lies above, but preferably not more than 10° to 30° C. above, the nominal operating temperature or the nominal operating temperature range. In this way, one can assure that the peripheral sealing of an MEA, by which the connection to a sealing frame around the MEA is produced at the same time in the sense of the invention, when used as intended in a fuel cell with the predetermined nominal operating temperature is sufficiently soft that any mechanical stresses can be equalized, which is especially advisable when using thermoplastic sealing materials. Moreover, it has been found that one can then choose a geometry for the composite of MEA, seal and sealing frame so that the sealing material surrounding the MEA, which forms a kind of bridge between the MEA and the sealing frame, can come into contact with the bipolar plates situated on either side of the MEA in the finished fuel cell stack and adhere to it—thanks to its softness at operating temperature—which can further improve the sealing action of the sealing composite.

As already mentioned at the outset, the subject matter of the invention is not only the above explained production method, but also a correspondingly produced membrane electrode assembly with a peripheral seal and peripheral sealing frame for an electrochemical cell, especially for a fuel cell.

Of course, all aspects and preferred modifications already explained above in connection with the method of the invention are equally applicable to the MEA according to the invention, so that to avoid repetition we make reference to them. The MEAs provided with a peripheral seal and a sealing frame according to the invention can be entirely prefabricated and be used in especially simple manner to construct a cell stack for an electrochemical cell (such as a fuel cell).

A membrane electrode assembly with peripheral seal according to the invention is preferably suitable for use in a LT-PEM fuel cell at nominal operating temperatures <100° C. or in a HT-PEM fuel cell or in a phosphoric acid fuel cell (PAFC) at nominal operating temperatures up to 150° C., up to 200° C. or up to 250° C.

Moreover, the invention also concerns a fuel cell stack with a plurality of membrane electrode assemblies of the kind in the invention, separated by bipolar plates. Obviously the same aspects and preferred modifications apply her as were already explained above.

In particular, the invention thus also concerns a fuel cell stack of the aforementioned kind in which each bipolar plate (on different sides) lies against the sealing frame of the particular membrane electrode assemblies adjoining it and wherein each sealing frame acts as a kind of end stop to dictate the minimum distance between the bipolar plates adjoining the particular membrane electrode assembly on either side. The sealing frame of the different MEAs of such a fuel cell stack thus form a kind of "hard stop", with which damage to the individual MEAs by the bipolar plates due to excessive compression can be prevented.

Of course, the sealing frame for its part can be sealed off by suitable sealing means against the bipolar plates or contain a further seal, which is of special advantage when the media being supplied and removed in the course of the operation of a fuel cell are supplied and removed by an internal manifold of the fuel cell stack, for which supply and sealing channels can be suitably provided through the sealing frame.

Generally, however, in the context of the sealing concept of the invention, an external or internal manifold must be provided for the supplying and removal of the media required or removed in the course of the fuel transformation.

BRIEF DESCRIPTION OF THE DRAWINGS

Various sample embodiments of the invention will be explained more closely below with the help of the drawing. There is shown FIG. 1, an illustration of a sample embodiment of the method according to the invention for creating a membrane electrode assembly according to the invention with peripheral seal made from a thermoplastic material and a sealing frame surrounding the MEA and seal, FIG. 2, a schematic representation of a sample embodiment of a membrane electrode assembly according to the invention with peripheral seal and sealing frame FIG. 3, an illustration for the especially advisable production of a sealing frame which can be used in the context of the present invention, FIG. 4, endurance measurements on the development over time of the cell voltage on units produced from MEA according to the invention with peripheral seal as compared to reference MEAs and, FIG. 5, measurement results on various start-stop cycles on the MEAs subjected already to an endurance test per FIG. 4.

DETAILED DESCRIPTION OF THE PREFERRED EMBODIMENTS

Figure 2:
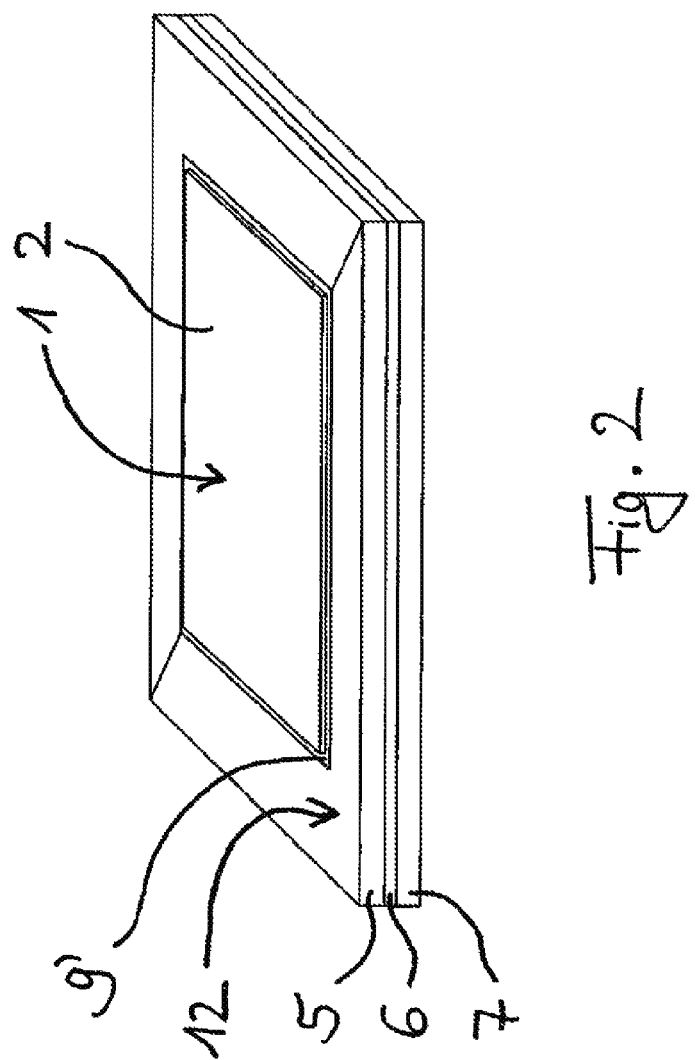

FIG. 1 shows a first process step (A) and a second process step (B) for creating a membrane electrode assembly. In process step (A), an upper representation, right, a margin region of an MEA 1 produced in a first process step (A) (and already hot pressed at present), which is formed in usual manner by a sandwiched arrangement of two gas diffusion electrodes 2, 3 and a (polymer electrolyte) membrane 4 lying inbetween. To the left of this is arranged at predetermined distance d a sealing frame 12 consisting of three—not yet bonded together—layers 5, 6, 7, forming a gap 8 open toward the outer edge of the MEA 1, in which a sealing material 9 (such as THV) is arranged—adjacent to the lateral outer edge of the MEA 1.

Then, in a process step (B), the arrangement shown in process step (A) above is pressed between pressing plates, whereby in one variant embodiment of the present invention a hot pressing operation takes place between heatable pressing plates, and by suitable dictating of the temperature of the hot pressing operation one makes sure that the thermoplastic sealing material 9, for example, is heated up to (much more than) its melting point (i.e., its melting temperature or the melting interval), so that it is brought into a flowable state.

After subsequent cooling, the composite of an MEA 1 with peripheral seal 9' and sealing frame 12 is obtained, represented in partial cross section at the bottom of FIG. 1 and shown in full in perspective view in FIG. 2.

During the hot pressing process, on the one hand the three layers 5, 6, 7 of the sealing frame 12 in the present example, consisting of a fabric-reinforced plastic (such as Chemfab), can be firmly bonded together. Moreover, the sealing material 9 arranged in the gap 8 of the sealing frame 12 open toward the outer edge of the MEA 1 can penetrate during the hot pressing operation into the gap between the sealing frame 12 and the MEA 1 and bond (exclusively) from the outer lateral edge of the MEA 1 with both the membrane 4 and the gas diffusion electrodes 2, 3, wherein a portion of the sealing material 9 thanks to its flowability during the hot pressing process penetrates on both sides of the membrane 4, namely, into the regions 10, 11, laterally into the open pore structure of the gas diffusion electrodes 2, 3. The gas diffusion electrodes 2, 3 in advantageous fashion are not covered with sealing material 9 on their side facing away from the membrane 4.

However, it is explicitly pointed out that, for example, in the case of using suitable sealing materials for LT-PEM fuel cells, as was already explained above, a heating need not necessarily occur during the pressing process.

The seal 9', which entirely surrounds the MEA 1 at the side after cooling or hardening has been completed, then makes a connection between the MEA 1 and the sealing frame 12. In other words, the MEA 1 is held inside the sealing frame 12 exclusively by the seal 9'.

The sealing frame 12 here has a predetermined thickness $D_1$—due to the dimensioning of the three layers 5, 6, 7—which is slightly less than the thickness $D_2$ of the MEA 1. Now, if the composite of MEA 1, seal 9' and sealing frame 12 is arranged in usual manner between the bipolar or separator plates of a fuel cell (or some other electrochemical cell), the sealing frame 12 so produced from a largely incompressible material constitutes an end stop ("hard stop") for the bipolar plates, dictating the maximum possible compression of the slightly thicker MEA 1. Moreover, the seal 9' which is softened during the operation of the fuel cell sticks to the bipolar plates of the fuel cell adjacent to the top and bottom side, so that a good sealing action to the outside can be achieved—without the need for further sealing means in the region of the sealing frame 12.

The sealing material 9 to be used specifically for the production of the seal 9' can be chosen in especially preferred manner by taking into account the predetermined operating temperature of the electrochemical cell (not shown) in which the MEA 1 plus seal 9' and sealing frame 12 is going to be installed. Advantageously, one can use a thermoplastic material 9 whose melting point lies just above, advantageously not more than 10°-30° C. above, the operating temperature of the electrochemical cell (such as a fuel cell), so that the seal 9' surrounding the MEA 1 during operation of the fuel cell is somewhat softened and can therefore absorb any mechanical stresses. The thermoplastic material THV already mentioned above and which is relatively economical already exists in the most diverse of compositions with different melting temperatures. Thus, for example, one can obtain from 3M Dyneon the materials "THV 221GZ", "THV 500GZ", "THV 610GZ" and "THV 815GZ" with melting temperatures of (in the same order) 115° C., 165° C., 185° C. and 225° C. The material "THV 221GZ" is advantageously suitable for use in LT-PEM fuel cells, while the other three mentioned THV variants are advantageously suited for use in HT-PEM fuel cells.

Figure 3:
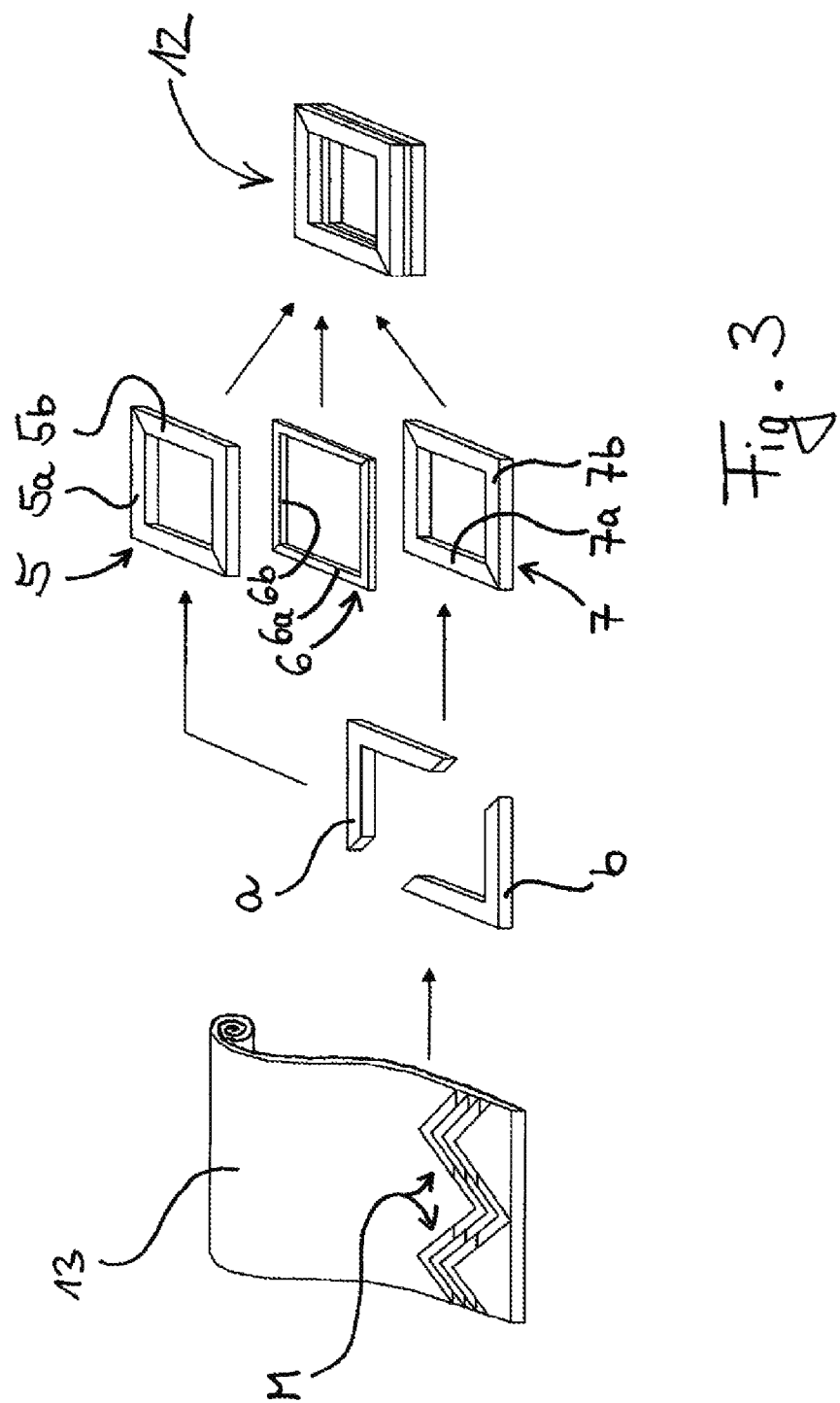

FIG. 3 shows an illustration for the especially expedient production of a sealing frame 12 which can be used in the context of the present invention. Here, one can cut out individual pieces, especially L-shaped legs a, b from a material present as a roll 13, using a herringbone pattern M. Every two such L-shaped legs 5a, 5b; 6a, 6b; 7a, 7b can then be assembled into a layer 5, 6, 7 of the later sealing frame 12, it being especially advantageous when arranging them to make the sealing frame 12 that every two adjacent layers are oriented with a 90° offset to each other, so that the joints resulting between every two L-shaped legs in the individual layers 5, 6, 7 are not adjacent to each other.

In the present case, the individual pieces 5a, 5b, 7a, 7b of the upper and lower layer 5, 7 of the sealing frame 12 were obtained from the roll 13 of material shown in FIG. 3 at left, while the pieces 6a, 6b of the thinner layer 6 were obtained—in identical fashion—from a roll of thinner material.

With membrane electrode assemblies 1 with peripheral seal 9' and sealing frame 12 produced according to the invention it has already been possible to perform various tests, whose results are explained below with reference to FIGS. 4 and 5.

The MEAs tested and outfitted according to the invention with a peripheral seal 9' and a sealing frame 12 were produced in exactly the above-described manner. They contain a phosphoric acid doped membrane based on PBI, suitable for the operation in a HT-PEM fuel cell at an operating temperature of 160°. These are flush-cut MEAs with gas diffusion electrodes terminating flush with the membrane.

As the thermoplastic material for the seal, the commercially available material "THV 500GZ" from 3M Dyneon was used, which has a melting temperature—determined according to the standard ASTM D4591—of 165° C., while the production in step (B) of the invented method of a connection between the seal and the outer edge of the MEA (with lateral penetration of the sealing material into the gas diffusion electrodes) on the one hand and the sealing frame on the other hand was done in the course of a hot pressing operation at a temperature of 230° C. As the material for the sealing frame, three layers of a fiberglass-reinforced PTFE (available under the "Chemfab" brand) were used.

The active surface of the square EA (124 mm edge length) was 153 cm$^2$. The thickness of the MEA was 620 μm. The square sealing frame surrounding the MEA had an outer edge length of 144 mm and an inner length of 124.5 mm in the region of the upper and lower layers 5, 7. The intermediate space had an outer edge length of 144 mm and an inner length of 135.5 mm. The three layers of the fiberglass-reinforced PTFE had a thickness of 225 μm (outer layers 5 and 7) and 120 μm (intermediate layer 6).

The "THV 500GZ" layer 9 was 200 μm thick before the hot pressing operation. The hot pressing operation was done at 230° C., lasted for 4 min., and the pressing force was 77 kN. The active surface of the MEA was maintained without pressure in this process. The resulting pressing force on the hard stop formed by the sealing frame was thus 3.2 kN/cm$^2$—defined by the surface of the intermediate space of 23.8 cm$^2$. The thickness of the sealing frame after the operation was 540 μm.

Three of these structural units of MEA, thermoplastic seal and sealing frame made according to the invention were installed at the same time with four reference MEAs in a test fuel cell stack with 20 cells, which was operated using a simulated reformate at an operating temperature of 160° C. (i.e., only 5° C. below the melting point of the sealing material used).

Figure 4:
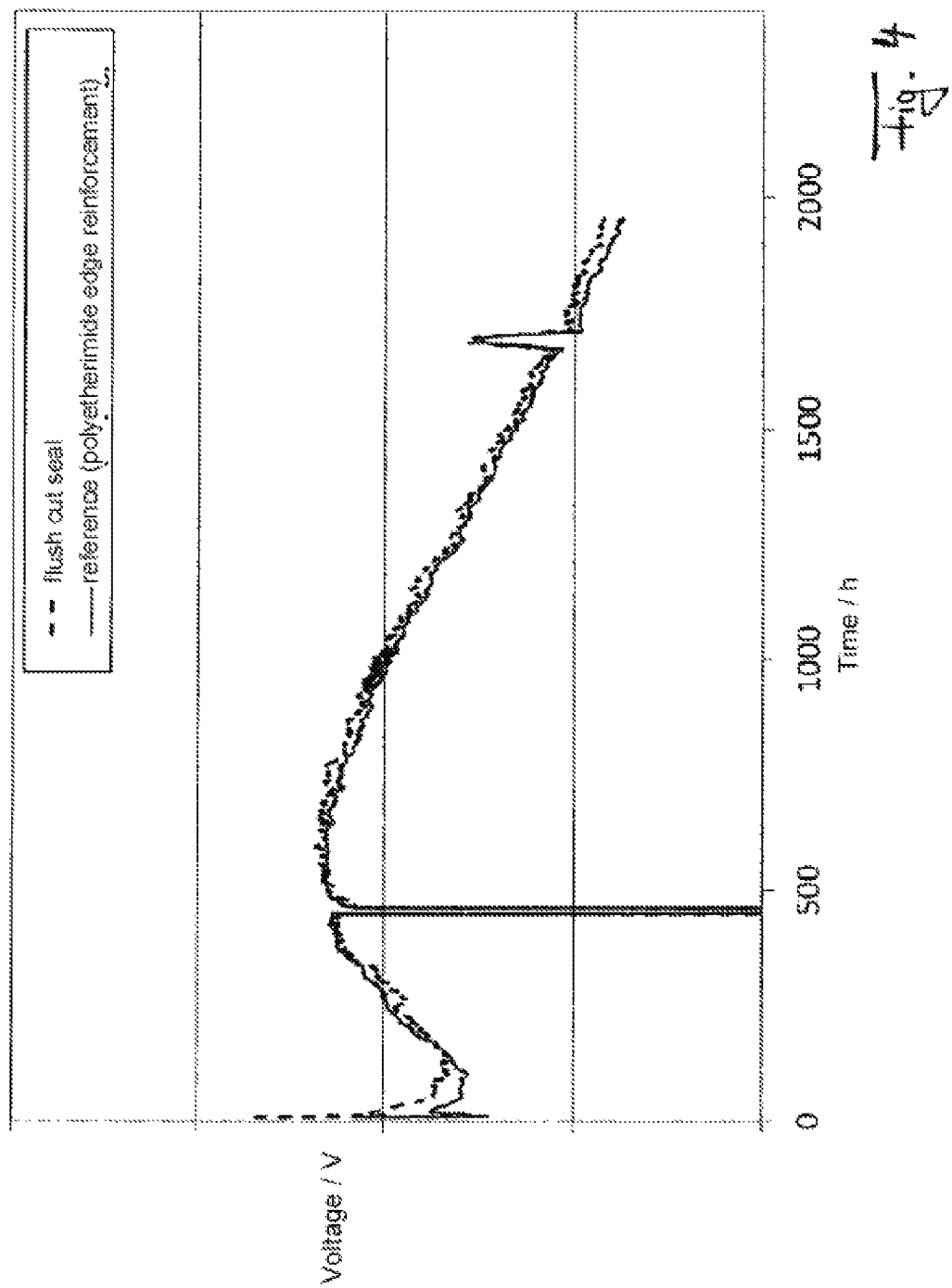

FIG. 4 shows the time variation of the mean value (not given in absolute values for purposes of a purely qualitative comparison) of the cell voltage on the three structural units according to the invention with "flush-cut seal" as compared to the mean value of the cell voltage of the reference MEAs operating in the same test fuel cell stack, making use of MEAs with membrane protruding beyond the gas diffusion electrodes and a polyetherimide edge reinforcement, as is often used at present for HT-PEM fuel cells.

It was found that the MEAs produced according to the invention with THV seal and sealing frame under continuous operation of nearly 2000 hours with other conditions being identical were able to provide an even slightly higher cell voltage than the significantly more costly MEAs with poly (ether) imide edge reinforcement. Moreover, it was found that the cell voltages of the three MEAs produced according to the invention with seal and sealing frame had only extremely slight deviations relative to each other, which shows the good reproducibility of a qualitatively better production of the MEA/sealing frame composite.

The drop in the cell voltage shown in FIG. 4 at an operating time of just under 500 hours of operation resulted from a brief disconnection of the test fuel cell. The (abrupt) rise in the respective cell voltages evident at around 1700 hours of operation was the result of a brief disconnection of the carbon monoxide feed to the simulated reformate, which was being supplied to the respective fuel cells of the test fuel cell stack.

Figure 5:
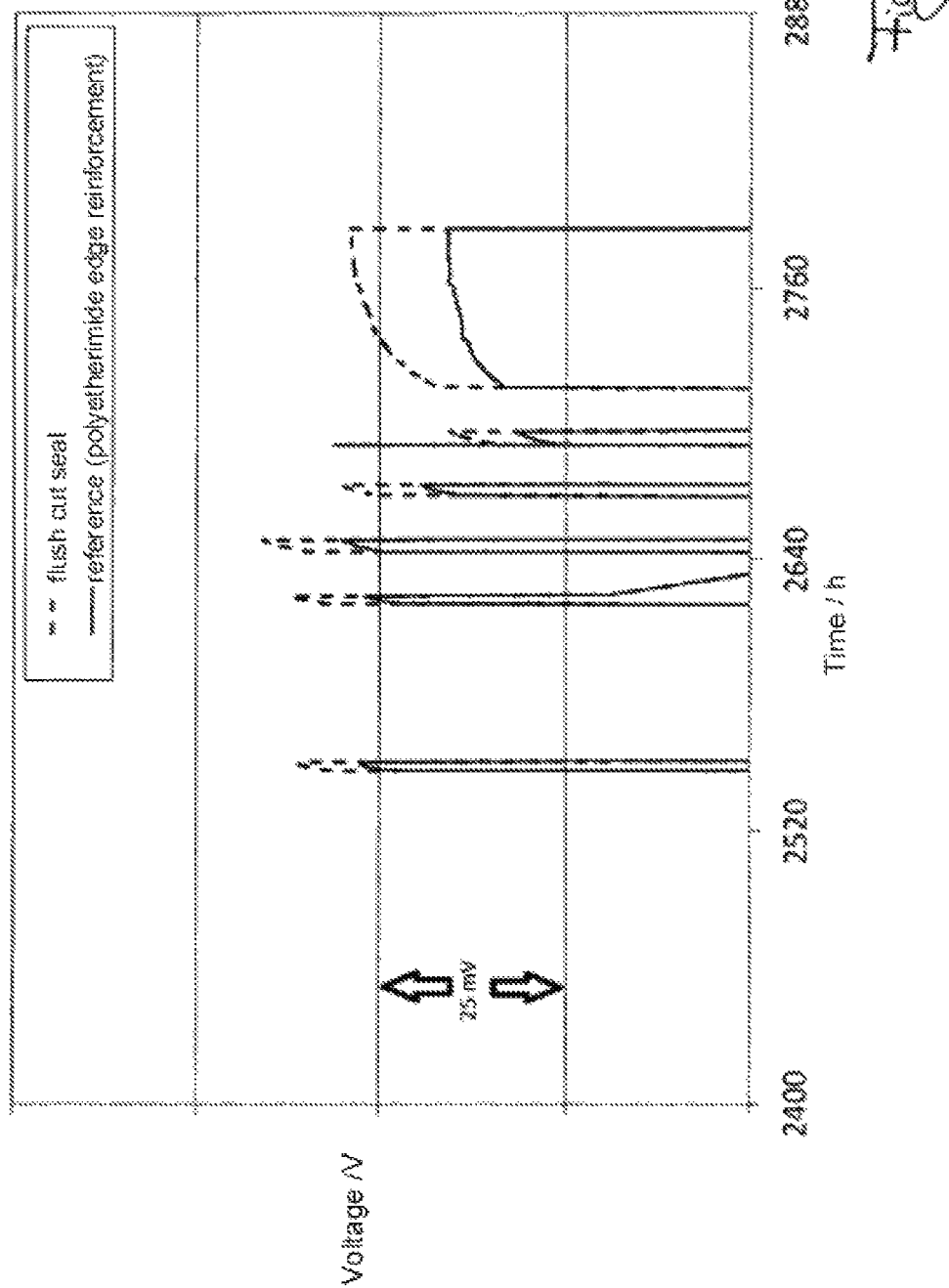

FIG. 5 finally shows the mean values found for the cell voltages during start/stop cycles of varying duration, performed at later points in time, which was done on the same MEAs where the test measurements of FIG. 4 had already been conducted. The measurement data from FIG. 5 shows

What is claimed is:

1. A method for making a membrane electrode assembly provided with a peripheral seal and a peripheral sealing frame for an electrochemical cell comprising:
   making of a sandwich arrangement forming the membrane electrode assembly from a membrane and two gas diffusion electrodes, and
   connecting of the sandwich arrangement to a seal encircling it on its outer side edge, which at the same time provides the connection to the sealing frame encircling the membrane electrode assembly with a distance at the side,
wherein the connecting is done by using a pressing operation and wherein a sealing material of the seal bonding the membrane electrode assembly to the sealing frame is arranged in a gap of the sealing frame open to the outer side edge of the membrane electrode assembly prior to performing the pressing operation, such that a portion of the sealing material which is flowable during the pressing operation penetrates laterally into the two gas diffusion electrodes.

2. The method of claim 1, wherein the membrane electrode assembly, the sealing material and the sealing frame are suitable for use in a LT-PEM or HT-PEM fuel cell.

3. The method of claim 1, wherein the pressing operation is a hot pressing operation during which the sealing material is heated to a temperature lying above its melting temperature or above its melting range.

4. The method of claim 1, wherein the sealing material is thermoplastic and in particular a fluoropolymer.

5. The method according to claim 1, wherein the sealing frame is made from at least two layers of a material with a coefficient of thermal expansion less than $3*10^{-5}$ $K^{-1}$ at 20° C.

6. The method of claim 5, wherein each layer of the sealing frame is composed of two pieces of a fabric-reinforced plastic.

7. The method of claim 1, wherein the membrane electrode assembly is hot pressed before carrying out the connecting or at the same time as carrying out the connecting.

8. The method of claim 1, wherein the membrane electrode assembly is made by the flush cut process.

9. The method of claim 4, wherein the thermoplastic sealing material is made from at least two monomer components, whose proportions have influence on the melting temperature or the melting range of the thermoplastic sealing material.

10. The method of claim 4, wherein the membrane electrode assembly is provided for use in a fuel cell at a predetermined nominal operating temperature or within a predetermined nominal operating temperature range, wherein the melting temperature or the melting range of the sealing material is selected or adjusted so that the melting temperature or the melting range of the sealing material lies above, but preferably not more than 10° to 30° C. above, the nominal operating temperature or the nominal operating temperature range.

11. A membrane electrode assembly for an electrochemical cell; with a peripheral sealing frame made according to the method of claim 1.

12. The membrane electrode assembly of claim 11, wherein the membrane electrode assembly is suitable for use in a LT-PEM fuel cell at nominal operating temperatures less than 100° C. or in a HT-PEM fuel cell or in a PAFC at nominal operating temperatures up to 150° C., up to 200° C. or up to 250° C.

13. A fuel cell stack with a plurality of membrane electrode assemblies according to claim 11, separated by bipolar plates.

14. The fuel cell stack of claim 13, wherein each bipolar plate lies against the sealing frame of the particular membrane electrode assemblies adjoining it and wherein each sealing frame acts as an end stop to dictate the minimum distance between the bipolar plates adjoining the particular membrane electrode assembly on either side.

15. The fuel cell stack of claim 13, wherein an external or internal manifold is provided for the supplying and removal of the media required or removed in the course of the fuel transformation.

16. The method of claim 1, wherein the electrochemical cell is a fuel cell.

17. The membrane electrode assembly of claim 11, wherein the electrochemical cell is a fuel cell.

18. The method of claim 4, wherein the fluoropolymer is THV.

19. The method of claim 5, wherein the material is a fiber reinforced plastic.

* * * * *